Feb. 12, 1957

H. J. WOOD 2,781,210

LABYRINTH SEAL

Original Filed Sept. 17, 1949

HOMER J. WOOD,
INVENTOR.

BY

ATTORNEY

United States Patent Office 2,781,210
Patented Feb. 12, 1957

2,781,210

LABYRINTH SEAL

Homer J. Wood, Sherman Oaks, Calif., assignor to The Garrett Corporation, Los Angeles, Calif., a corporation of California Original application September 17, 1949, Serial No. 116,370, now Patent No. 2,684,196, dated July 26, 1954. Divided and this application April 25, 1952, Serial No. 284,423

5 Claims. (Cl. 286—10)

The present invention relates generally to an improved labyrinth seal construction and method of making the same, and finds particular use in compact high velocity turbine driven units of the type utilized for air conditioning and refrigeration, especially in aircraft.

The present application constitutes a division of my copending application, Serial No. 116,370, filed September 17, 1949, now issued Patent No. 2,684,196.

It is one object of the herein described invention to provide improved sealing means for the turbine end of the unit.

Further objects and advantages of the invention will be brought out in the following part of the specification wherein a detailed disclosure of the invention is made for the purpose of disclosing one embodiment thereof without limiting the scope of the invention.

Referring to the drawings which are for illustrative purposes only:

Figure 1:
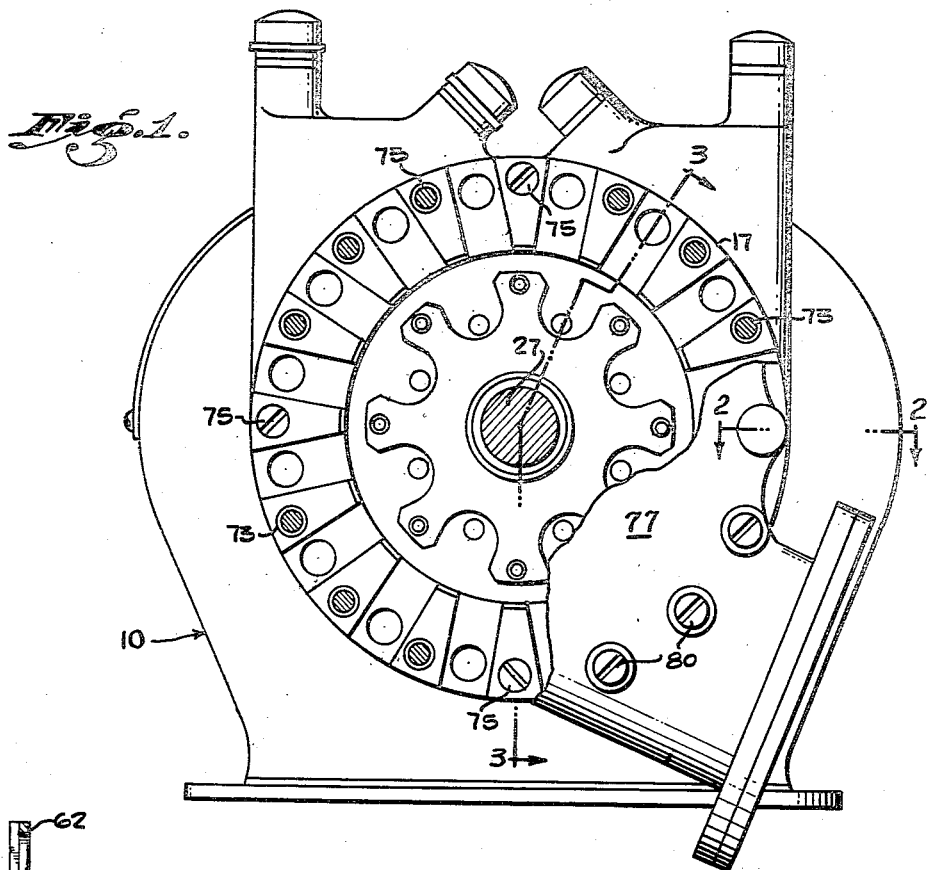
Fig. 1 is an end elevational view of the turbine end of the unit, portions being cut away to disclose internal constructional details.
Figure 3:
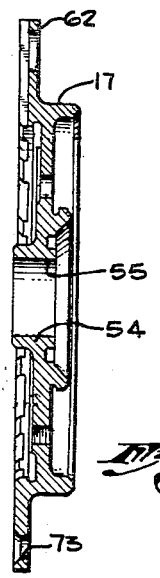
Fig. 3 is a detailed sectional view through the turbine end sealing member, taken substantially on line 3—3 of Fig. 1.

Referring now to the drawings, for illustrating purposes there is shown in Fig. 1 a fan unit containing a labyrinth seal constructed according to the present invention.

Figure 2:
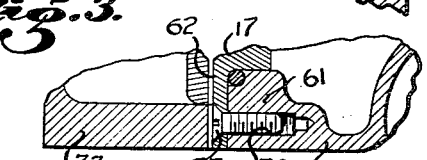
Fig. 2 is a fragmentary sectional view, taken substantially on line 2—2 of Fig. 1.

Briefly as shown primarily in Figs. 1 and 2, the unit embodies a main housing 10 and a turbine end casing 77 secured thereto as by securing screws 80. A seal member 17 of generally disc like construction is secured between the main housing and turbine end casing, the seal member being affixed to the housing 10 as by screws 75 which pass through openings 73 and threadedly engage threaded sockets 76 in an end flange 61 of the main housing cooperatively associated with a peripheral flange 62 of the seal member.

The seal member centrally contains a tubular hub 54 which defines a tubular bore 55 for reception of the main shaft 27 of the unit therethrough, the shaft within the tubular bore 54 being provided with an annular member 31 which may, if desired, constitute a hub portion of a slinger or fan element (not shown) of the bearing lubricating system, or comprise simply a shaft collar.

Figure 4:
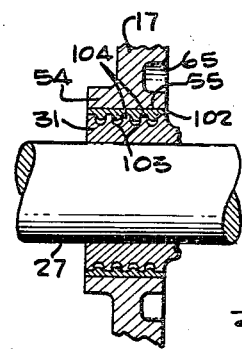
Fig. 4 is an enlarged fragmentary sectional view showing details of the labyrinth seal around the turbine end of the shaft.

The details of the labyrinth seal at the turbine end of the unit between the hub 31 and hub 54 of the seal member 17, will now be explained. Referring to Fig. 4, the bore 55 of the hub 54 is coated with a lining 102 of a composition containing lead, or other suitable composition which has a suitable plastic flow characteristic. The hub 31 has its outer surface formed with a plurality of spaced circumferentially extending grooves 103 defining spaced lands 104. As initially fabricated, the internal diameter of the lining 102 is made slightly less than the outside diameter of the lands 104. To assemble and complete the labyrinth seal, the seal member 17 is supported in axially aligned position by the screws 75 which are in starting position in the threaded sockets 76, such that as these screws are tightened, the lining 102 will pass over the grooved surface of the hub 31.

The sharp edges of the lands 104 will thus act as cutting members to provide a tubular inner surface of uniform diameter on the lining and give a broached fit between the lining and surface of the lands. The parts are then disassembled and cleaned to remove any particles of metal, and then again assembled. Upon subsequent operation of the unit, the surface contact of the lands with the inner surface of the lining applies pressure and heat to the composition comprising the lining 102 and causes plastic flow deformation which bulges the material of the lining into the grooves 103 slightly and thus forms a labyrinth seal and takes care of any slight eccentricity which might be present. It is this slight eccentricity and slight axial movements of the shaft and hub 31, inherent during operation of the rotating structure, that causes engagement of the edges of the lands 104 with the lining 102 so as to result in the plastic flow, as explained above.

I claim:

1. The method of forming a labyrinth seal between adjacent parts of relatively rotatable members adapted to operate in concentric relation which comprises lining the surface of one of said members with a material having a plastic flow characteristic, forming circumferential grooves defining spaced projecting rings in the other surface, assembling the members by relative axial movement and broaching said material with said rings to provide a broached fit, and thereafter flowing the lining into the grooves between the rings as a result of slight relative eccentric movements between the members upon relatively rotating said members.

2. The method of forming a labyrinth seal between adjacent parts of relatively rotatable members adapted to operate in concentric relation which comprises lining the surface of one of said parts with a material containing lead having a plastic flow characteristic, forming circumferential grooves defining spaced projecting rings in the surface of the other member, broaching the lining surface of one part by relative axial movement of the members whereby the broached surface conforms to the periphery of the rings, and thereafter flowing the lining into the grooves between the rings as a result of slight relative eccentric movements between the members upon relatively rotating said members.

3. The method of forming a labyrinth seal between adjacent surfaces of relatively rotatable members adapted to operate in concentric relation, one of said members having a surface lined with a material having a plastic flow characteristic and the other having a circumferentially grooved surface defining spaced projecting rings, the initial relative diameters of the lining surface and the rings being such that the rings project past the lining surface, which comprises the steps of: initially assembling the members by relative axial movement so as to broach the lining surface with the rings; and thereafter flowing the lining into the grooves between the rings as a result of slight relative eccentric movements between the members upon relatively rotating said members.

4. A seal structure, comprising: a shaft; a wall member having a central bore for the passage of said shaft; a tubular bore lining having an inner surface of initially uniform diameter, said lining being of material having a plastic flow characteristic; and means carried by the shaft having spaced circumferentially extending surface grooves defining annular lands adjacent the inner surface of said bore lining, said lands upon initial assembly of said shaft within said wall member having a broached fit in said bore lining, said lining material being bulged by plastic flow into said grooves to form a labyrinth seal by slight eccentric movements of said shaft causing engagement of said lands with the inner surface of said bore lining.

5. A seal structure as recited in claim 4 wherein said lining material contains lead.

References Cited in the file of this patent

UNITED STATES PATENTS

| | | |
|---|---|---|
| 888,064 | Chambers | May 19, 1908 |
| 1,179,594 | Wood | Apr. 18, 1916 |
| 1,466,953 | Loomis | Sept. 4, 1923 |
| 2,044,692 | Huhn | June 16, 1936 |
| 2,058,993 | Keller | Oct. 27, 1936 |
| 2,149,524 | Huhn | Mar. 7, 1939 |
| 2,336,323 | Warren | Dec. 7, 1943 |
| 2,367,882 | McKnight | Jan. 23, 1945 |

FOREIGN PATENTS

| | | |
|---|---|---|
| 524,048 | Great Britain | July 29, 1940 |